G. PRIMBS.
MACHINE FOR MANUFACTURING BOX SHELLS.
APPLICATION FILED NOV. 8, 1907.

915,380.

Patented Mar. 16, 1909.
8 SHEETS—SHEET 1.

Witnesses
J. K. Moore
Wm E. Popp

Inventor
George Primbs
By Whitaker Prevost
Attys.

G. PRIMBS.
MACHINE FOR MANUFACTURING BOX SHELLS.
APPLICATION FILED NOV. 8, 1907.

915,380.

Patented Mar. 16, 1909.
8 SHEETS—SHEET 4.

Witnesses.

Inventor.

G. PRIMBS.
MACHINE FOR MANUFACTURING BOX SHELLS.
APPLICATION FILED NOV. 8, 1907.
915,380.
Patented Mar. 16, 1909.
8 SHEETS—SHEET 5.
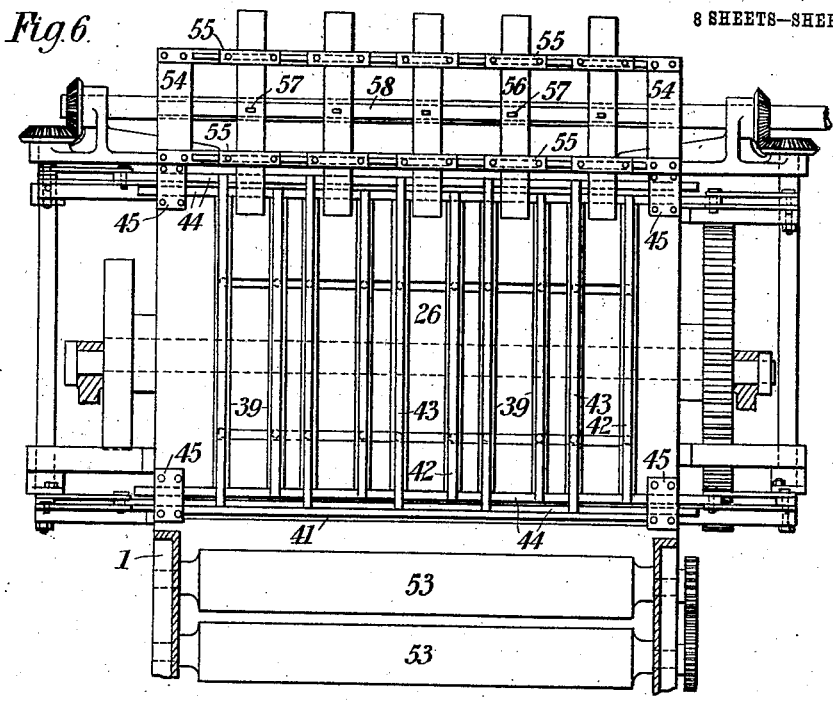
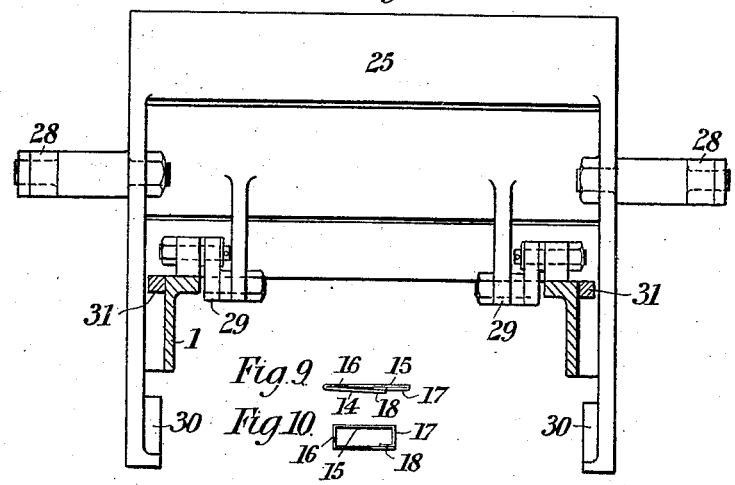
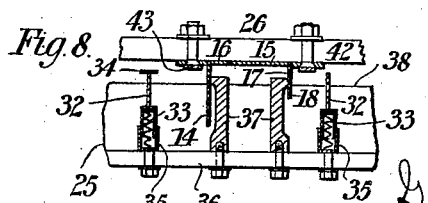
Witnesses.
J. K. Moore
Wm. E. Ripp
Inventor
George Primbs
By Whitaker Prevost Atty.

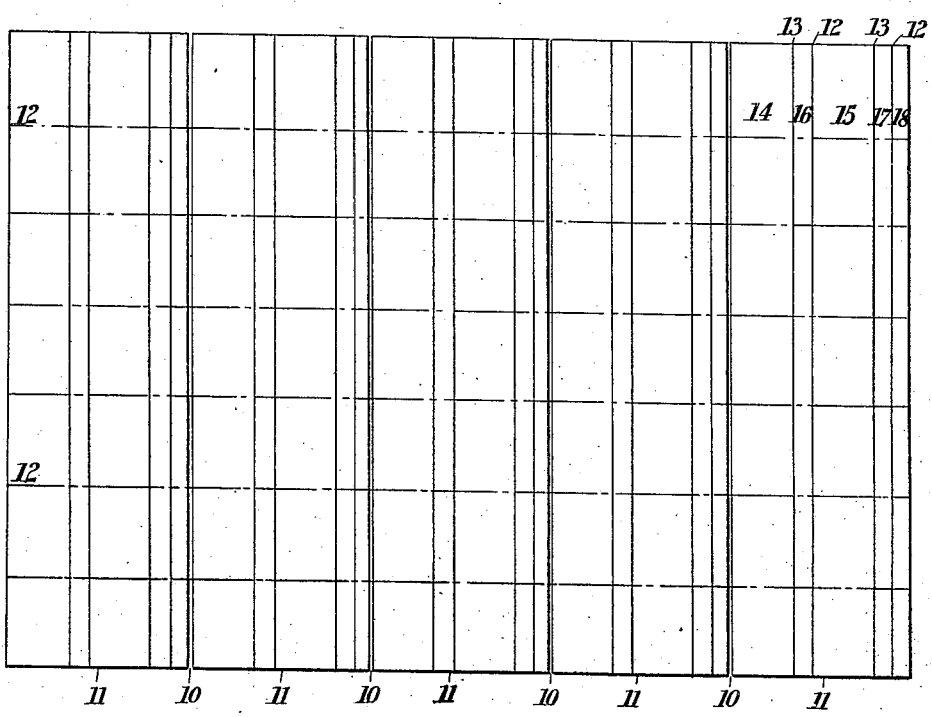

G. PRIMBS.
MACHINE FOR MANUFACTURING BOX SHELLS.
APPLICATION FILED NOV. 8, 1907.
915,380.
Patented Mar. 16, 1909.
8 SHEETS—SHEET 7.
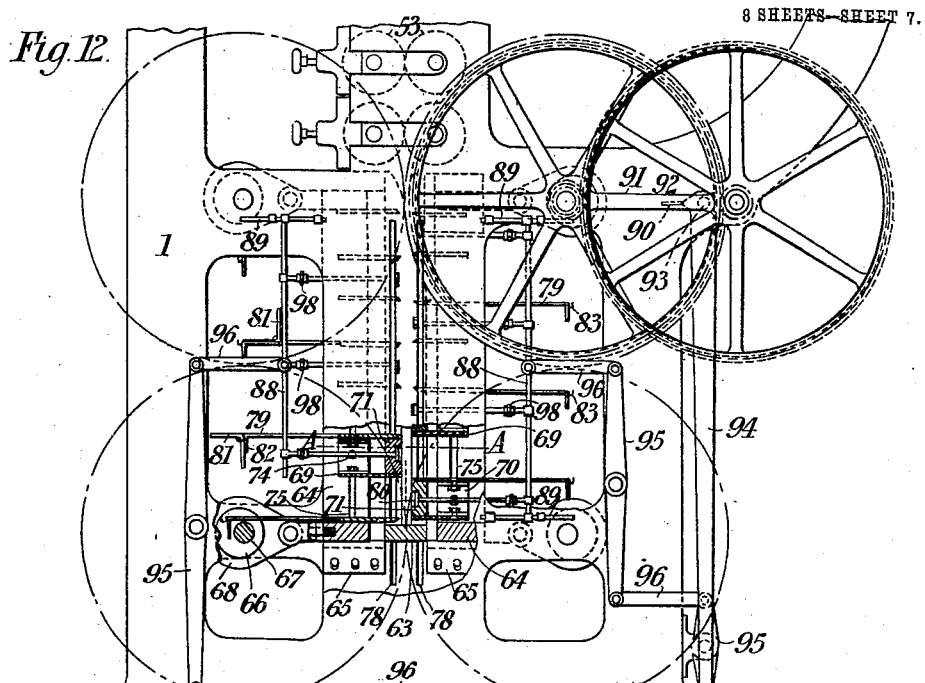

G. PRIMBS.
MACHINE FOR MANUFACTURING BOX SHELLS.
APPLICATION FILED NOV. 8, 1907.
915,380.
Patented Mar. 16, 1909.
8 SHEETS—SHEET 8.
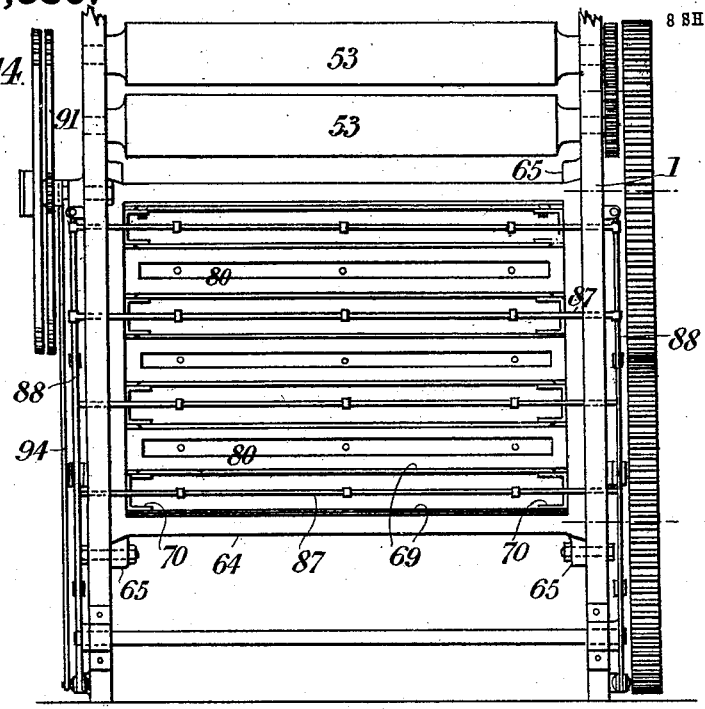
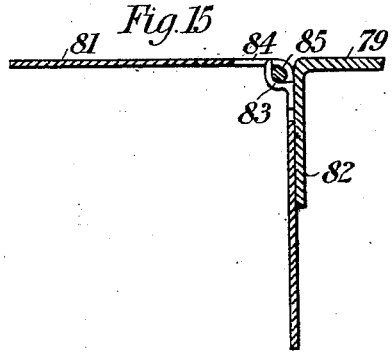
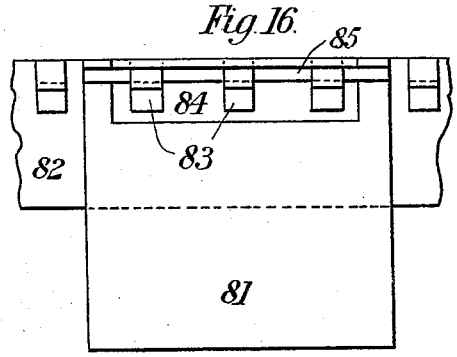
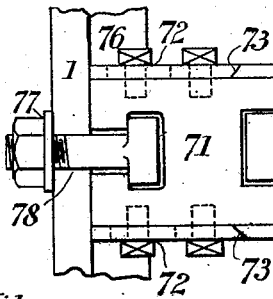
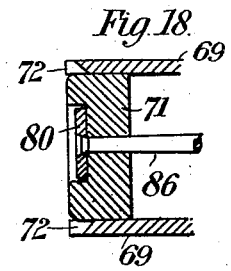
Witnesses.
J. K. Moore
Wm. E. Bopp
Inventor.
George Primbs
By Whitaker Prevost
Attys.

UNITED STATES PATENT OFFICE.

GEORGE PRIMBS, OF JOHANNESBURG, TRANSVAAL.

MACHINE FOR MANUFACTURING BOX-SHELLS.

No. 915,380.  Specification of Letters Patent.  Patented March 16, 1909.

Application filed November 8, 1907. Serial No. 401,296.

*To all whom it may concern:*

Be it known that I, GEORGE PRIMBS, a subject of the King of Great Britain, residing at 18 Davis street, Johannesburg, in the Colony of the Transvaal, have invented a new and useful Machine for Manufacturing Box-Shells, of which the following is a specification.

The present invention relates to machinery for manufacturing the shells of cardboard or similar boxes of the shell and tray type, that is boxes comprising an outer open-ended shell and a tray or drawer fitting into such shell.

Machines of this class are known in which a continuous strip of paper is fed constantly into the machine, grooved for bending, glued at the edge, bent and folded to tubular form by passing between fixed formers and pressed to consolidate the glued joint.

The primary object in the present instance, is to provide a machine which operates upon separate flat sheets and in consequence comprises novel mechanism for effecting the bending and folding.

A further object is to provide for duplication of the parts in one machine as aforesaid so that a large number of shells may be produced simultaneously from one sheet of material, and to render all necessary parts adjustable to produce shells of varying dimensions.

The invention also provides for delivering the finished products in a compact and readily portable form in separate counted batches and furnishes means whereby such batches may be readily tied up and withdrawn from the delivery tables by the attendant.

Figure 1:
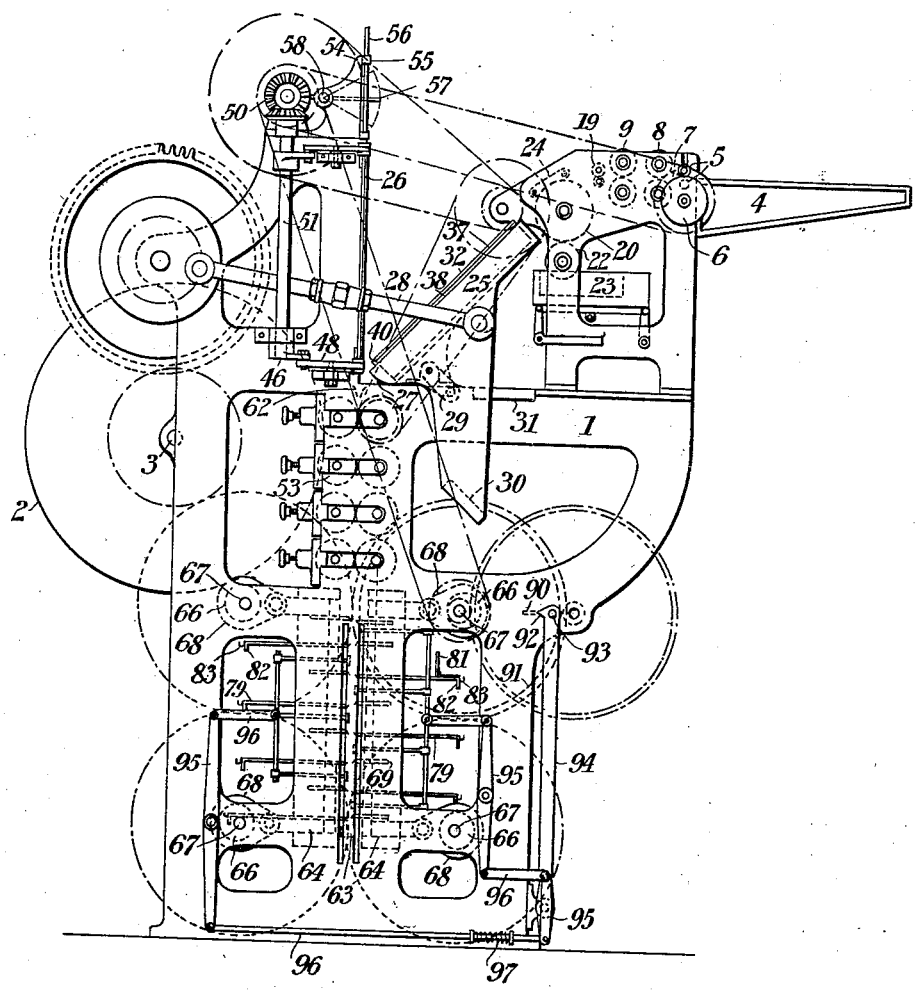
Figure 2:
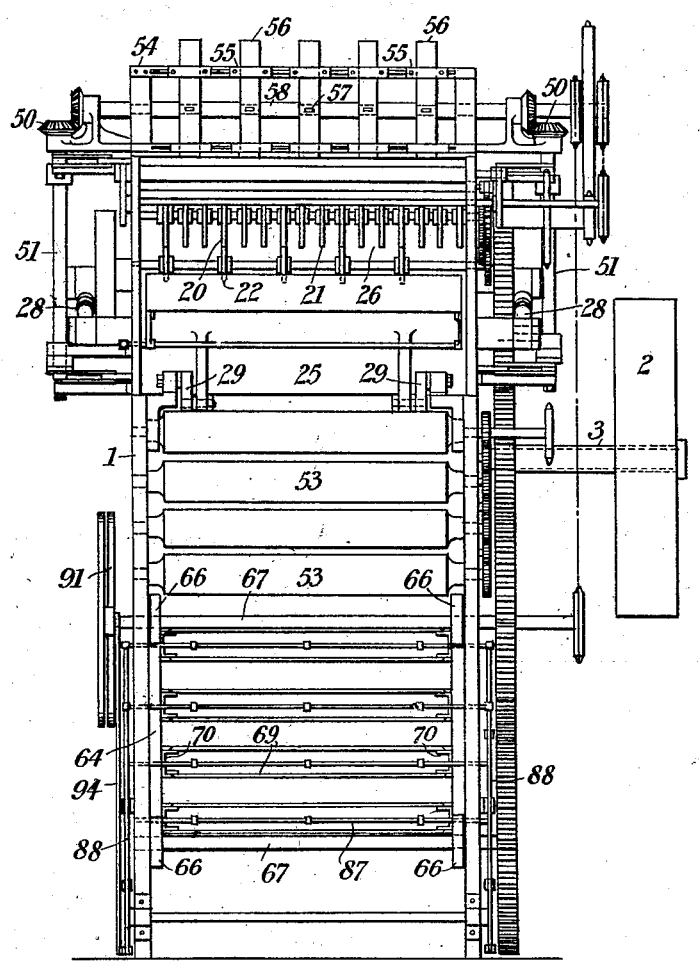
Figure 3:
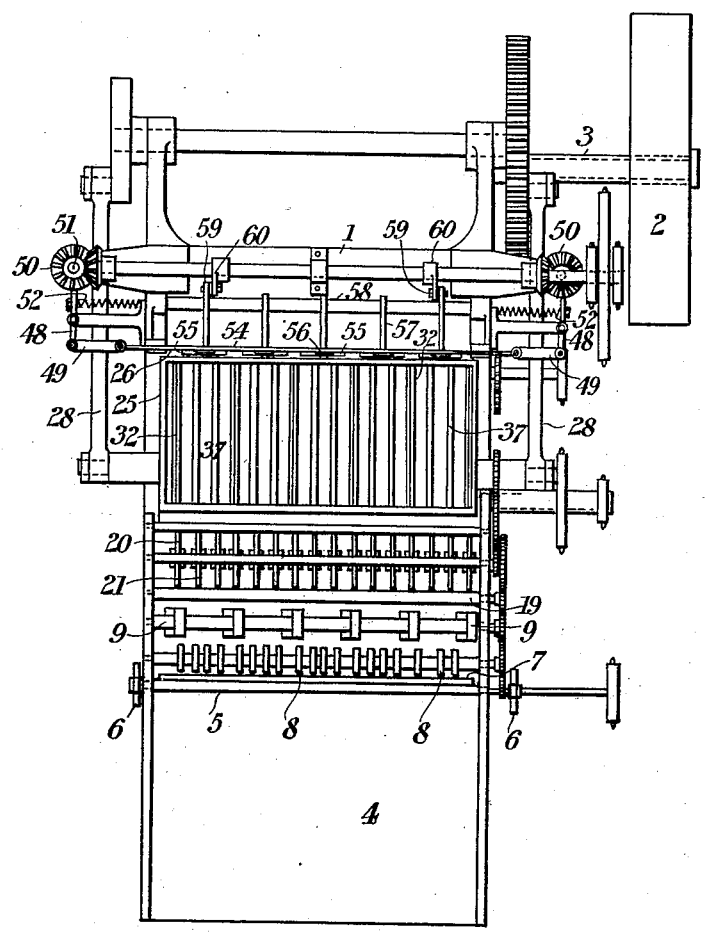
Figure 4:
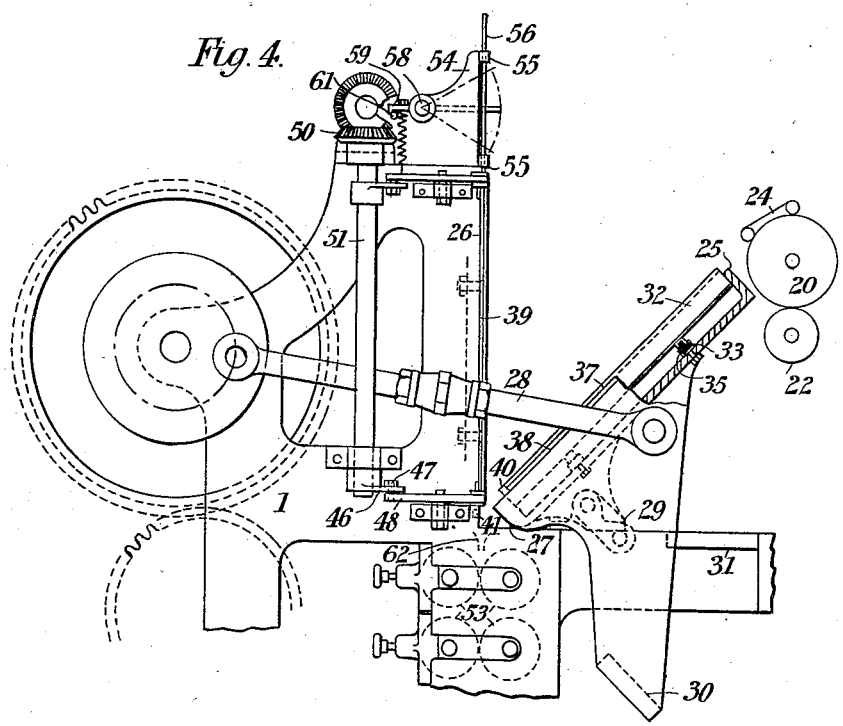
Figure 5:
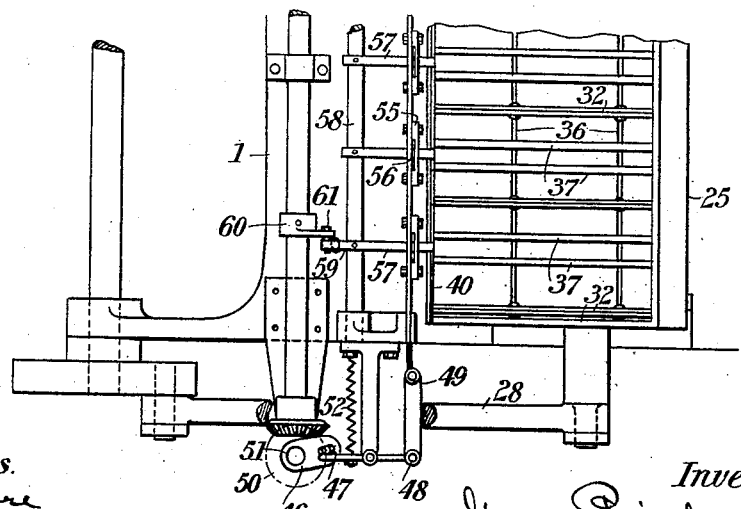

In the accompanying drawings which illustrate the preferred embodiment of the invention, Figure 1 is a side elevation, Fig. 2 a front elevation and Fig. 3 a plan of the complete machine. Fig. 4 is a side view enlarged, and Fig. 5 a half plan of the die box, die plate and concomitant parts as described hereinafter; Fig. 6 is a front view of the die plate with the die box removed and Fig. 7 is a rear view of the die box alone; Fig. 8 is a further enlarged detail of parts of the die box and die plate with the partially formed shell therein; Figs. 9, 10 and 11 illustrate the shells in various stages of manufacture; Fig. 12 is a side elevation of the severing, counting, and delivering mechanism, part being shown in mid section; Fig. 13 is a sectional plan of the same upon the line A—A, Fig. 12, and Fig. 14 is a front elevation of the same; while Figs. 15 to 18 show details relative thereto.

1 indicates the framework of the machine; 2 the main pulley which may be driven by a belt from a suitable motor and is keyed upon a shaft 3. From this shaft all other moving parts of the machine are driven by positive means such as gear wheels or chains and sprockets in order to effect the necessary synchronism of the various movements. A feed table 4 is provided for supporting the pile of the flat sheets, which may have been printed as desired upon the exterior of the shell, the printed side being placed uppermost upon the table.

The sheets are fed separately into the machine by known means such as to pass at the proper moment one sheet only.

From the feed mechanism the sheet passes to the grooving rolls 8 of known construction which indent upon the upper surface of the sheet the lines upon which the shells are subsequently to be bent; and thereafter shearing rolls 9 cut the sheet into strips from which several shells joined end to end are afterward formed.

The machine as illustrated is adjusted to produce thirty-five shells from each sheet; and the condition of the sheet after passing the grooving and shearing rolls is illustrated in Fig. 11. The sheets are sheared from end to end as at 10 into strips 11, of the expanded width of a shell: the fine lines 12 and 13 indicate the longitudinal grooves dividing each strip into five sections. Referring to the right hand strip in the figure, 14 and 15 are the sections which ultimately form the top and bottom of the shell, 16 and 17 the sides, while 18 indicates the section which is to be lapped under and secured to the section 14 as hereinafter described.

Both sets of rolls,—for grooving and shearing,—may be adjusted along their shafts for the purpose of altering either the dimensions or number of the shells as may be required.

From the shearing rolls, the strips are carried by drawing rolls 19 to the gluing mechanism which may also be of any well known type; comprising for instance, gluing rolls 20, intermediate supporting rolls 21, feed rolls 22 for passing glue from the glue trough 23 to the gluing rolls 20, and resilient bands 24 for pressing the cards around the gluing rolls. Glue is applied to the underside of the free edge of the section 14 of each strip.

The next set of operations consists in pressing up the blank strips to channel sections, folding over each upstanding part in succession, thereby forming flat tubular strips of which the longitudinal edges are glued together, and passing such tubular strips to the pressing rolls which consolidate the glued edges.

A die box 25 is arranged to reciprocate between the inclined position illustrated and a vertical position in contact with the fixed die plate 26. To this end the die box 25 is provided with a suitably curved foot 27 adapted to rock and slide upon a prepared portion of the framework 1, connecting rods 28 operated by revolving cranks which impart a swinging motion to the die box, links 29 for restraining the lower end of the box and slippers 30 which come into contact and slide upon guide surfaces 31 upon the framework 1. This motion mechanism,—which it is to be understood is not novel *per se*,—causes the box to reciprocate from the inclined to the vertical position and back again with a momentary rest at either end of the stroke, while at the moment of contact with the die plate the box moves perpendicularly to the same, and is capable of exerting considerable pressure thereon.

Within the box 25 and extending from the top to the bottom thereof are a number of partitions 32 which operate to guide the strips of card as they come from the gluing rolls and to separate them slightly from one another. Such partitions are mounted upon springs 33 so that they may be depressed into the box upon contact with the die plate.

The partitions may be formed of inverted T section as shown to the right of Fig. 8, or they may be provided with additional heads 34 to prevent the sheets from being displaced forwardly. The sockets 35 in which the partitions are resiliently secured are bolted through slots 36 formed in the back of the box, so that the partitions may be shifted transversely to accommodate strips of different widths.

Arranged between each pair of partitions and secured in the same slots 36 so as to be adjustable transversely, are pairs of cameo flexing dies 37, their upper faces projecting slightly above the rim 38 of the die box. Upon the die plate 26, with means for adjusting them laterally, are corresponding pairs of vertically disposed die bars 39, the distance between the bars of each pair being slightly greater than the outside dimensions of each pair of flexing dies 37, such bars thus constituting with the surface of the die plate, intaglio dies corresponding to the aforesaid cameo dies.

The operation of bending is performed as follows. The die box being at the back of its travel and inclined toward the gluing rolls the flat strips of card pass down from the latter onto the flexing dies 37 in such a position that the grooves 13, Fig. 11, lie directly over the outside edges of the flexing dies, the strips being guided by the partitions 32 as before mentioned and brought to rest against the projecting stop 40. The die box now moves forward to the die plate, whereupon the flexing dies 37 force the sections 15 and 16 of the strips into the recess between the die bars, and turn up at right angles thereto the section 14 on one side and sections 17 and 18 on the other. The die box is thereafter retracted and leaves the strips sticking into the recesses. In Fig. 8 the flexing dies are moving away from the pressed strip. A slot 41 is sunk in the die plate to receive the stop 40 during flexing. The folding of the strips to a flat tubular form is performed by the folding bars 42 and 43, one each of which is provided for each strip to be operated on. Bars 42 first move transversely across the face of the die plate and fold down the projecting sections 17 and 18 of the strips against the sections 15 and 16 lying in the recesses; immediately thereafter bars 43 move in the opposite direction, following closely upon the now retiring bars 42, to fold the section 14 down onto section 18. The former having been glued as already described adheres to section 18 upon the bars moving back to their initial position.

Fig. 9 shows the cross section of the strip after being folded, and in comparison therewith Fig. 10 is an end view of a completed shell after being opened by hand. The folding bars 42 and 43 are mounted upon transverse supporting bars 44 so as to be adjustable thereon in accordance with the other adjustable parts already described. The supporting bars 44 are slidable in guides 45 and are oscillated at the desired intervals by constantly rotating cranks 46, the pins 47 of which actuate pivoted levers 48 to which the supporting bars 44 are coupled by links 49. The pins 47 are made traversable upon the cranks 46 for the purpose of altering the travel of the supporting bars; and the phase of the reciprocations may be varied by shifting the bevel wheels 50 upon their shafts 51, or by other convenient means. Springs 52 serve to return the folding bars to their initial position after the latter have been actuated by the crank pins. Situated under the die plate is a series of pressing rolls 53 for consolidating the joints of the tubular strips; and immediately after the folding bars have finished their work, the strips are passed down to engage with said rolls. For this purpose there is provided over the die plate 26, a slotted framework 54 upon which are secured, with transverse adjustability, pairs of guides 55 within which ejecting plungers 56 are slidable vertically, one ejector being provided for each tubular strip. Such ejectors are forced downward simultaneously at the desired moment by arms 57 adjustably secured along a shaft 58 which is arranged to oscillate by means of fingers 59, cranks 60 and adjustable crank-pins 61, similar to those described in connection with the folding bars. The strips are guided to the presser rolls by curved plates 62, and having passed the series of rolls drop below them in a vertical position against a stop 63 preparatory to being severed along lines 12$^a$, Fig. 11 into individual shells. Forming, with the aforementioned stop 63, the recess into which the strips drop from the rolls is a pair of frames 64 mounted in V slides 65 so as to be reciprocable bodily toward or away from one another. Motion is imparted to the frames by means of eccentrics 66, keyed upon synchronously rotating shafts 67, and eccentric straps 68 coupled to the frames. The cutting knives 69 which extend transversely across the frames are secured in pairs to channel irons 70, one above and one below, said channel irons being in turn bolted to the side members of the frames 64. The pairs of knives upon one frame alternate with those of the other, the knives of each frame coacting with those of the other in cutting. Between each pair of knives is arranged a bar 71, fixed to the framework 1 of the machine, which serves to support the knives and also to carry the pusher bars hereinafter described.

In Figs. 17 and 18, the former of which is a front view, and the latter a cross section, the arrangement is shown to a much enlarged scale; 71 being the bar and 69 the knives working above and below the same, the knives being held to the bar for guidance by means of retaining plates 72 covering their beveled edges 73. In adjusting the severing mechanism to produce shells of different length, that is from one open end to the other, the knives 69 are detached from their supporting channel irons 70, which latter are then removed and replaced by others of the desired width, the bolts 74 by which they are secured to the frames 64 being traversible in slots 75 to permit the channel irons being fixed wherever necessary. To the same end the extremities of the bars 71 are held in vertical troughs 76 in the main framework 1 and are secured by projecting bolts 77 which pass through bolt slots 78. The troughs 76 are open at the bottom and by loosening the bolts 77 the bars 71 may be lowered and withdrawn from the bottom of the troughs preparatory to inserting others of the necessary width. It will be noted that the uppermost and lowermost knives need not be removed when adjusting for the length of the shells. Tables 79 are fixed to or at the level of the uppermost of each pair of knives; as the shells are separated by the knives they are forced by the beveled edges of each pair of knives onto the uppermost blade of the next lower pair upon the opposite frame and, as they accumulate, out onto the tables. It will be understood that the shells are delivered in the flattened state into which they are brought by the folders, and that before inserting the tray into them it is necessary to press them open by hand to the form shown in Fig. 10. Such flattened condition renders the shells easy to pack and transport.

When, as is usual, it is desired to deliver the shells in batches containing a definite number each, such as one hundred, the following arrangement may be employed. Within recesses in the faces of the bars 71 are sunk pusher bars 80. Such pusher bars, when the desired number of shells has been cut, and between the cutting of the last set of strips of one batch and the delivery to the cutters of the first of the next batch, are given a sharp outward and return motion which has the effect of pushing all the first batches clear of the knives and onto the tables 79. With each table are associated several angle brackets 81 corresponding in number to the batches delivered to the table, against which the several completed batches for that table are thrust by the pusher bars and which support said batches when so thrust out. The edges of the table are provided with downwardly turned flanges 82 from which project hooks 83. The brackets 81 are cut away at the angle to clear such hooks, as at 84, and are provided with a wire 85 secured in the angle, which, when the bracket is drawn to the edges of the table, catches in the hooks 83 and forms a pivot about which the brackets rotate to assume the position shown in Figs. 15 and 16. As the batches are thrust out against the corresponding brackets the attendant ties each one around with string which he also passes around the bracket. He or another attendant then draws each bracket with its pack to the edge of the table where it falls over as mentioned, enabling the pack to be readily withdrawn horizontally from it, whereupon it is returned to receive and support the batch next thrust out. To facilitate replacing the brackets their under surfaces may be provided with projecting lugs which work in slots cut into the surface of the tables.

In the constructions shown the pusher bars 80 are detachably fixed to the ends of rods 86 projecting from transverse rods 87 which in turn are adjustably secured to vertical rods 88 slidably mounted upon the framework 1 by their T-heads 89. The desired intermittent motion is derived from a pin 90 upon the wheel 91 which is geared down to make one revolution during say one hundred strokes of the cutting mechanism. Such pin operates to lift the short arm 92 of a lever pivoted at 93 upon the main framework, the motion being multiplied by the long arm 94 which, as will be readily understood from the drawings, actuates the rods 88 through intermediate levers 95 and links 96. A spring 97 retracts the parts after the pin 90 has left the lever arm 92. To permit their withdrawal during adjustment of the severing mechanism, the rods 86 are made in sections united by screw couplings 98.

Having now particularly described and ascertained the nature of my said invention and in what manner the same is to be performed, I declare that what I claim is:—

1. In a box shell making machine, the combination with mechanism for scoring a blank longitudinally, forming it into a flat tube with longitudinal overlapped portions, and uniting said overlapped portions, of cutting devices disposed transversely of the said tube for simultaneously severing it into a plurality of box shells of desired length, substantially as described.

2. In a box shell making machine, the combination with mechanism for scoring a blank longitudinally, forming it into a flat tube with longitudinal overlapped portions, and uniting said overlapped portions, of cutting devices disposed transversely of the said tube for simultaneously severing it into a plurality of box shells of desired length, and means for adjusting the said cutting devices with respect to each other to produce shells of different lengths, substantially as described.

3. In a box shell making machine, the combination with devices for scoring a sheet of material, of cutting mechanism operating between scored portions of the scored sheet for separating it into a plurality of sections, mechanism for simultaneously forming said scored sections into flat tubes having longitudinally overlapping portions and uniting said overlapping portions, and cutting devices for severing each of said flat tubes into a plurality of box shells of the required length at a single operation, substantially as described.

4. In a box shell making machine, the combination with devices for scoring a blank, of cutting mechanism operating between scored portions of the blank for separating it into a plurality of sections, mechanism for simultaneously forming said scored sections into flat tubes having longitudinally overlapping portions and uniting said overlapping portions, and cutting mechanism for simultaneously severing each of said flat tubes formed from the sections of a single blank, into a plurality of box shells of required length, substantially as described.

5. In a box shell making machine, the combination with means for feeding and scoring a sheet of material, of means for forming the scored sheet into a flat tube with longitudinal overlapping portions and uniting said overlapping portions, means for adjusting said forming devices to form tubes of different sizes, and cutting mechanism for severing said flat tube transversely into a plurality of box shells of the required length at a single operation, substantially as described.

6. In a box shell making machine, the combination with means for feeding and scoring a sheet of material, of means for forming the scored sheet into a flat tube with longitudinal overlapping portions and uniting said overlapping portions, means for adjusting said forming devices to form tubes of different sizes, cutting mechanism for severing said flat tube transversely into a plurality of box shells of required length at a single operation, and means for adjusting said cutting mechanism to produce shells of different length, substantially as described.

7. In a box shell making machine, the combination with means for feeding and scoring a sheet of material, of cutting mechanism operating between scored portions of the sheet for separating it into a plurality of scored blank sections, forming mechanism for forming the said sections into flat tubes having overlapping portions and uniting said overlapping portions, means for adjusting said scoring, cutting and forming mechanism, to form tubes of different widths, and means for severing each of said tubes into a plurality of box shells of required length at a single operation, substantially as described.

8. In a box shell making machine, the combination with means for feeding and scoring a blank, of cutting mechanism operating between scored portions of the blank for separating it into a plurality of scored blank sections, forming mechanism for forming the said sections into flat tubes having overlapping portions and uniting said overlapping portions, means for adjusting said scoring, cutting and forming mechanism, to form tubes of different widths, means for severing each of said tubes into a plurality of box shells of required length at a single operation, and means for adjusting said cutting mechanism to form shells of different length, substantially as described.

9. In a box shell making machine, the combination with means for feeding and scoring a blank, of cutting mechanism operating between scored portions of the blank for separating it into a plurality of scored blank sections, forming mechanism for forming the said sections into flat tubes having overlapping portions and uniting said overlapping portions, means for adjusting said scoring, cutting and forming mechanism, to form tubes of different widths, means for simultaneously severing each of said tubes into a plurality of box shells of required length, substantially as described.

10. In a box shell making machine, the combination with means for feeding and scoring a blank, of cutting mechanism operating between scored portions of the blank for separating it into a plurality of scored blank sections, forming mechanism for forming the said sections into flat tubes having overlapping portions and uniting said overlapping portions, means for adjusting said scoring, cutting and forming mechanism, to form tubes of different widths, cutting devices for simultaneously severing each of said tubes into a plurality of box shells of required length, and means for adjusting said cutting devices to produce tubes of different length, substantially as described.

11. In a box shell making machine, the combination with mechanism for feeding and scoring a sheet or blank of a width sufficient for a plurality of box shells, of a pair of bending plates located on opposite sides of the path of the sheet, and movable one toward and from the other, one of said plates being provided with a plurality of longitudinally disposed intaglio dies, and the other provided with a plurality of longitudinally disposed cameo dies, substantially as described.

12. In a box shell making machine, the combination with mechanism for feeding and scoring a sheet or blank of a width sufficient for a plurality of box shells, of a pair of bending plates located on opposite sides of the path of the sheet, and movable one toward and from the other, one of said plates being provided with a plurality of longitudinally disposed intaglio dies, and the other provided with a plurality of longitudinally disposed cameo dies, and a plurality of folding dies movable laterally across the face of said plates, substantially as described.

13. In a box shell making machine, the combination with mechanism for scoring the blank, of forming mechanism, including two plates reciprocable with respect to each other, one of said plates being provided with cameo dies and the other with intaglio dies, folding dies movable laterally with respect to said plates and reciprocating plungers for ejecting the formed blanks endwise from said plates, substantially as described.

14. In a box shell making machine, the combination with scoring mechanism, of forming mechanism comprising a pair of plates reciprocable with respect to each other, one of said plates being provided with yieldingly supported portions, adapted to be depressed by contact with the other plate, one of said plates having cameo folding dies and the other plate having intaglio folding dies, substantially as described.

15. In a box shell making machine, the combination with scoring mechanism for a blank, of cutting mechanism for severing the blank into a plurality of longitudinal sections, forming mechanism for operating simultaneously on all of said blank sections, and comprising two plates, reciprocable with respect to each other, and provided with coöperating dies for engaging each blank section, laterally movable folding devices and means for discharging said formed blank sections from said forming devices, substantially as described.

16. In a box shell making machine the combination with scoring mechanism for a blank, of cutting mechanism for severing the blank into a plurality of longitudinal sections, forming mechanism for operating simultaneously on all of said blank sections, and comprising two plates, reciprocable with respect to each other, and provided with coöperating dies for engaging each blank section, laterally movable folding devices, means for discharging said formed blank sections simultaneously from the forming devices, and means for simultaneously severing each of said formed blank sections into a plurality of box shells, substantially as described.

17. In a box shell making machine, the combination with mechanism for forming a blank into a flat tube of greater length than the box shells, of cutting mechanism for severing each of said tubes into a plurality of box shells, a support for said severed box shells, means for indicating when a determined number of shells have been severed and delivered upon said support, and mechanism timed with said cutting mechanism for intermittently operating said indicating mechanism, substantially as described.

18. In a box shell making machine, the combination with mechanism for forming a blank into a flat tube of greater length than the box shells, of cutting mechanism for severing each of said tubes into a plurality of box shells, a support for said severed box shells, a pushing device movable over said support, and mechanism timed with the cutting mechanism for intermittently operating said pushing mechanism, substantially as described.

19. In a box shell making machine, the combination with mechanism for forming a blank into a flat tube of greater length than the box shells, of cutting mechanism for severing each of said tubes into a plurality of box shells, a support for said severed box shells, a bracket movable on said support for supporting the severed shells in vertical position, a pushing device movable over said support, means timed with the cutting mechanism for operating said pushing device, said support and bracket having devices forming a pivotal connection between them when the bracket is moved to bring said devices together, whereby said bracket is permitted to swing on said pivot into a horizontal position to facilitate the delivery of the severed shells, substantially as described.

GEORGE PRIMBS.

Witnesses:
   HOMER GENDRON,
   GEORGE A. SAVOY.